Patented Jan. 16, 1934

1,943,331

UNITED STATES PATENT OFFICE 1,943,331

METHOD OF TREATING ORES

Thomas A. Mitchell, Denver, Colo., assignor to Lafayette M. Hughes, Denver, Colo.

No Drawing. Application May 1, 1930
Serial No. 449,079

38 Claims. (Cl. 75—60)

My invention relates to the treatment of ores for the recovery of valuable metals therefrom and it is particularly applicable to the preparation of complex ores containing several metal compounds intermingled with undesired ingredients for a subsequent treatment by fluid reagents capable of converting ore metal values therein to soluble compounds.

The ores containing the valuable metals, such as zinc, lead, copper, iron, silver, gold and manganese, commonly occur in nature as sulfides, sulfates, oxides, silicates and carbonates, the first four metals being commonly found in the sulfide form. These ores may occur in simple forms containing but one of the valuable metals but more often they are complex mixtures of crystals of ore metal compounds, commonly occurring as sulfides, intermingled with one another and with large quantities of undesirable impurities, such as pyrite, and interspersed with the rock gangue of quartz and various silicates. It is this complexity of structure that has made it difficult or expensive to separate the ore values.

The metallurgical processes of the past have crystallized into certain standard practices which have well defined limitations and requirements; and these have been so hampering as to make it impractical or uneconomical to extract metal values from low-grade ores and many complex ores. In that metallurgical field which has to do with the sulfides of common metals, such as zinc, copper and lead, the standard practice has involved roasting the ore to form a sinter of oxides, sulfates, silicates, and various complex compounds of the ore materials which is then reduced in a smelting process to produce a single metal. In order to smelt the ore, it has been common practice to employ a flux and to carry on the roasting operation in such a manner as to form a sinter of the ore, so that the subsequent smelting operation will be more effective and the losses minimized. In spite of careful manipulation and control of such a process, yet it remains a fact that the smelter operator prefers, and often requires, that the ore be a simple one, or, if it be complex, that the ore does not contain over a fixed percentage of metals other than the one which predominates. For example, it is difficult to smelt a zinc ore containing over 8 or 10 percent of lead, and if the ore be essentially a lead ore then the zinc content should not be high.

Aqueous bath methods employed for extracting values from ores, and particularly those involving the treatment of raw or roasted sulfide ores by gaseous and liquid reagents, have presented problems, especially where the ore has been of a complex nature and the desired values were associated intimately with the gangue. For example, a sulfide ore which has a high silicate content sinters readily when roasted and thus forms a mass which is not easily penetrated by fluid reagents. Likewise, the particles of a roasted ore which is low in silicates tend to agglomerate into masses which are not easily attacked. Certain metals, such as zinc, tend to form both the oxide and the sulfate when the sulfide is roasted, as well as to react with iron compounds to form the difficultly treated ferrate and ferrite and with the gangue to form silicates and other compounds which are not easily chloridized by standard methods involving the use of reagent gases. Iron is a common impurity in ores, and it is desirable not only to prevent it from reacting with the desired ore metals but also to insure that it may be readily separated therefrom. If it is attempted to chlorinate a raw or a partially roasted dry sulfide ore by means of chlorine gas, not only is there a high loss of chlorine but undesired reactions also take place, such as the formation of free sulfur which coats and forms aggregates of the ore particles, with the result that some of the original sulfide remains unaltered. The problems involved in preparing an ore for a subsequent hydro-metallurgical treatment are many, and yet the economical aspects of such processes make desirable the preparation of ores, and particularly the complex ores, for a subsequent treatment by fluid reagents which convert the desired ore metal values to soluble compounds.

As the result of my experimentation I have found that it is practical, economical and efficient to treat complex ores, whether rich or lean, whether bulk concentrates or the raw ore, and whatever may be their chemical form as found in nature, whether sulfide, sulfate, silicate, oxide or carbonate or mixtures thereof, by a series of steps which prepare the ore for recovery of its values by such simple methods as solution and precipitation to form desired compounds of the metals, and yet to eliminate the compounds of undesired metals, such as iron, or to convert them to usable by-products. This process applies particularly to complex ores containing mainly zinc, lead, iron, copper, silver, gold, tin and sulfur, the first four metals being in the sulfide form to a large extent.

The primary object of my invention, therefore, is to attain these desirable ends and to provide a method of treating ores which prepares them for subsequent reaction with gaseous or liquid reagents capable of converting desired ore metal compounds to soluble and recoverable salts and particularly a method which is capable of treating either simple or complex ores in a highly efficient and economical manner.

A further object is to provide a method of treating complex ores which leaves them in a porous, friable or pulverulent condition and in such physical form that they may be easily leached and the metal values extracted therefrom progressively by solvents, and particularly by leaching solutions which convert the desired ingredients to easily recoverable compounds.

A further object is to roast an ore containing the sulfide of an ore metal, such as zinc, which tends to form either the oxide or the sulfate, and to carry on the process under low temperature conditions and in such a manner that the metal is converted to the oxide and may be readily recovered free from its sulfate, and particularly to so treat a complex ore containing such a metal that the several ore metal values may be separated and recovered efficiently.

A still further object is to provide a method of roasting a pulverulent sulfide ore in which low temperature conditions may be maintained, and the danger of the ore particles becoming sintered, fluxed or agglomerated may be obviated, and in which the ore metal values are exposed for attack by fluid reagents and may be easily converted to soluble compounds.

With these and other objects in view as will be apparent to one skilled in the art from the following disclosure, my invention resides in the steps of a process for treating ores as described in this specification and as covered by the claims appended hereto.

In accordance with my invention, and to accomplish these desired ends, I propose to calcine or roast a complex ore in the presence of a sulfur-bearing material and an alkaline earth metal compound which are capable of reacting to form an alkaline earth metal sulfate interspersed throughout the calcine, and the ingredients are so proportioned that a sufficient quantity of this alkaline earth material is present in intimate relation with the ore so as to insure that the resultant calcine is not hard, indurate, vitreous or sintered, but is a porous, friable or pulverulent material capable of permitting a substantially complete attack by various liquid or gaseous reagents which will convert the ore metal values to recoverable soluble compounds. For this purpose, I ordinarily so proportion the ingredients that the alkaline earth material forms a considerable proportion of the calcine, and preferably 10% of the mass. The ore and reagents are roasted in an intimately mixed condition, such as is obtained by pulverizing and mixing them together, and the roasting operation is carried on while the mixture is being thoroughly agitated and under furnace conditions which cause the formation of readily soluble compounds without producing undesired combinations of the ore metals with the ore impurities, and preferably without producing metallates by combination of the alkaline earth metal with the valuable ore metals.

As a further feature of this invention, I treat the calcine or roasted material with gaseous reagents, such as hydrochloric acid gas, which are capable of converting the ore metal values to soluble compounds, or with liquid reagents, such as are solvents for desired ore values, and I preferably utilize such reagents as will aid in separating the ore metal values from the undesired ingredients. The nature of the reagent will depend upon the type of ore being treated, but for the ores herein specified, I prefer to use initially such solvents as are capable of dissolving the ore metal oxides, such as zinc and copper oxides and then to treat the residue by such reagents as are indicated by the ingredients remaining therein. For example, I find ammoniacal ammonium sulfate or carbonate particularly effective for treating a zinc, iron, lead, copper ore since its dissolves the zinc and copper without taking the lead and iron into solution in the process herein described. A further feature involves the idea of utilizing such ingredients and so carrying on the process that the residue containing the impurities and gangue and other undesired ingredients of the ore may be obtained in a form and of a composition which is useful for various purposes. For example, if iron is present in any considerable quantity in a complex ore and it is not desired to recover the same as metal the process may be so carried on as to produce an iron pigment which is of commercial value.

If the ore contains a sulfide of a metal which tends to oxidize to either the oxide or the sulfate form when roasted in the presence of oxygen, I have discovered that the presence of an alkaline earth metal compound which is reactable with the available sulfate radical that remains in the calcine, as distinguished from the sulfur oxygen gases that go up the chimney, tends to prevent such ore metal sulfides as those of zinc, copper and silver from being oxidized to the sulfate form. I find that lead sulfide goes preferably to the sulfate form, although some oxide may be produced, but other metals such as zinc, copper and silver are protected, as it were, by the presence of an alkaline earth metal oxygen compound which reacts preferentially with the available sulfate radical and these metals remain as oxides, provided there is sufficient of the alkaline earth material present to combine with all of the available and reactable sulfate radical, not taken up preferentially by such an ore metal as lead. For example, zinc sulfide would be oxidized to zinc sulfate but for the fact that calcium oxide reacts more readily than does zinc oxide with the available sulfate radical, or sulfur trioxide, which would otherwise combine with the zinc oxide formed in the roast.

To accomplish the desirable end, I so proportion the alkaline earth metal compound relative to the amount of available sulfate radical, and I so control the furnace conditions that all of the reactable and available sulfate radical which stays in the calcine will unite with the alkaline earth metal by preference and prevent such metals as zinc from going to the sulfate form. These proportions are such that the resultant calcine is basic or contains some of the initial alkaline earth metal compound or said metal uncombined with the sulfate radical.

The production of an open and porous structure in the roasted ore particles is materially aided by mixing the ore in a finely divided condition with the alkaline earth metal compound in the presence of water. If, for example, the ore particles are mixed with lime and water, calcium hydrate is formed. When the wet slurry of ore and calcium hydrate is dried, the calcium hydrate becomes intimately associated with the ore and forms a coating on the surface of the ore particle and its pore walls and so occupies a protective position relative to the metal compounds of the ore. During the roasting operation, calcium sulfate forms by reaction of the lime with the available sulfate radical, and it may be hydrated at first; but as the temperature increases, the water of hydration of both the sulfate and the hydrate of calcium will be driven off. The removal of water from these various compounds during the roasting or the drying operation will serve to open up further pore spaces and channels within the ore particle and so increases the permeability of the ore to gaseous or leaching reagents.

The roasted particle consists of crystalline formations of intermingled ore metal compounds and the alkaline earth metal sulfate interspersed with pore pace. This mixture of the alkaline earth metal sulfate and the ore crystals is so intimate that the ore materials are physically separated and thus hindered from fusing or sintering together. Hence, the alkaline earth material has the further function of physically separating portions of the ore and preventing the formation of insoluble compounds, such as zinc ferrate, silicate or aluminate or other compounds which are difficultly converted to soluble salts.

The water and the alkaline earth serve a further function when the raw ore is mixed therewith, in that if there are sulfates of zinc or various other metals present in the raw ore, the sulfate radical is taken up by the alkaline earth metal. For example, if zinc sulfate is found in a sulfide ore, it will react with calcium hydroxide in the water solution to form hydrated calcium sulfate and thus give up its sulfate ion.

Of the alkaline earth metal compounds which may be employed in this initial calcination stage I prefer to use the oxides, hydroxides or carbonates of calcium, barium, strontium or magnesium, and I may utilize the materials found in nature containing these metals, such as limestone, dolomite, witherite and strontianite or products obtained by suitable treatment of these natural products. While the carbonate gives desirable conditions owing to the evolution of carbon dioxide gas within the calcining mixture, thus increasing its porosity, yet it is generally desirable to employ the oxides or hydroxides of the alkaline earth metals and particularly because they make it possible to carry on the reaction at a much lower temperature than that at which calcium carbonate will be decomposed by heat. In fact, I have found that for treating many sulfide ores the temperature of the roasting operation may ordinarily be just high enough to keep the sulfide burning to remove the sulfur therefrom. Even at the comparatively low temperature of an autogenous roasting operation, the oxygen compound of calcium will protect various types of ores and prevent the formation of the sulfates of zinc, copper and silver in the ultimate roast and insure their being present as an easily attackable oxide. It is not necessary that the lime store up heat or act as a refractory to keep the ore heated to any given temperature condition. The reaction in my process takes place at a low temperature.

The sulfur compound employed in the reaction will depend upon the nature of the ore being treated. If sulfur is not present in the ore or is not in sufficient quantity for the purpose, various sulfur compounds may be added which either oxidize to form a sulfate or furnish the sulfate radical directly for combination with the alkaline earth metal. For example I may add a pyritic ore or iron sulfide which will form sulfur trioxide during the roasting operation or I may employ sulfuric acid, or metal compounds containing the sulfate ion, such as the sulfates of zinc, aluminum and iron, and particularly the sulfates of metals which are present in the ore or which will not detrimentally affect the process employed for recovering the ore metal values. If a calcium or barium compound is employed in the reaction calcium or barium sulfate is produced and the sulfate radical is fixed as an insoluble alkaline earth metal sulfate which goes with the residue during a subsequent leaching operation in which soluble ore metal compounds are separated from the residue. On the other hand magnesium sulfate is soluble in water and if desired it may be removed from the calcine by leaching with water before the valuable ore ingredients are dissolved from the ore. Strontium sulfate will go largely with the residue.

This operation of roasting is preferably carried on at a comparatively low temperature so that the volatile materials of the ore will not be lost, and particularly so that the silicates and other fusible ingredients of the ore will not be fused or sintered or form a hard, indurate or vitreous mass and so as to avoid the formation of compounds of the alkaline earth metal and the ore metals. In this process, the production of calcium plumbate or zincate, for example, from a zinc or lead ore is not desired, and the ingredients are so proportioned and the furnacing operation is so carried on as to prevent such metallates from being formed and to produce the ore metal oxides insofar as possible. Also, this process minimizes the production of ferrates, aluminates or silicates from the ingredients of the ore mixture. If a carbonate, such as limestone, is employed, the temperature of the calcining reaction will be sufficiently high to convert the carbonate to an oxide; but if the oxide or hydroxide is employed then the temperature at which the roasting may be carried on may be much lower than the temperature required for decomposition of the carbonate. This enables one to keep down the temperature of the roasting operation so as to obtain the calcine in the desired friable or pulverulent condition without danger of its going to a fluxed, sintered or vitreous mass. It moreover will be appreciated that the thermal input required for the decomposition of limestone alone is less than the thermal input needed to heat not only the limestone but also a considerable amount of ore to a temperature condition required to decompose the limestone. Hence, from this viewpoint alone, it is preferable to burn the limestone in a separate operation to produce the calcium oxide and thus make it unnecessary to waste considerable heat in the ore calciner to maintain the ore mass at the higher temperature required for breaking down the carbonate.

The thermal energy required for the reaction may be obtained wholly or in part from the ore itself if there are material amounts of sulfide present, such as iron pyrites or the sulfides of the valuable ore metals, and the temperature conditions will be maintained and controlled as desired to produce the required end product. If the ore does not contain sufficient sulfur or other combustible material for generating this heat then I may add to the ore another ore sufficiently high in sulfur or other materials which will burn as desired, or the heat may be obtained solely from or supplemented by a gas, oil or other flame introduced into one end of the calcining chamber.

In order that the reactions may be accomplished to the maximum extent the ore, which may be either a raw ore of low or high grade or a highly concentrated one, is ground to a finely divided size and is intimately mixed with the alkaline earth material, such as calcium oxide, and preferably in the presence of water. This grinding operation has a very desirable effect in that it brings the alkaline earth metal compound into intimate contact with the ore material also it makes it possible for the oxygen of the roasting atmosphere to get at the sulfide hearts of the ore and to maintain oxidizing conditions throughout the calcine. Because of this intimacy of contact, the alkaline earth material is in a protecting position where it takes up the sulfate radical which might otherwise combine with the zinc oxide. This alkaline earth material coats and separates the ore metal particles and so tends to minimize any reactions among themselves, such as the formation during calcination of a zinc-iron compound which is not easily attacked during a chlorinating operation and causes waste of zinc. It is also desirable that the mixture of finely divided ore and alkaline earth material be agitated or stirred continuously during the roasting operation so as to minimize any tendency for the grains to sinter together and to provide a physical barrier which aids in keeping the zinc and iron from uniting.

In order to make sure that the calcine comes from process as a non-sintered and friable or pulverulent material, I preferably so proportion the alkaline earth material and the sulfur bearing content that the alkaline earth metal sulfate formed therefrom will constitute at least 10% of the total mass of the calcine, but this amount may be varied within wide limits, as determined by the nature of the ore being treated and the conditions of the calcining operation. If the ore is a sulfide, I preferably sample the ore and then calculate the amount of the alkaline earth metal compound as the molecular equivalent of those reactable metals which can remain as oxides in the calcine. This calculation may be suitably modified if an analysis of the calcined product shows the presence of any sulfate radical combined with an ore metal that should have combined with the alkaline earth metal. For example, if a zinc sulfide ore is being treated and zinc sulfate is found in the calcined product, this means that the amount of alkaline earth material should have been higher. I intend that the resultant calcine shall be basic in character or contain some of the initial alkaline earth metal compound that has not been converted to the sulfate when it comes from the calciner.

In order that the principles underlying my invention may be more fully understood, the application of this invention to the treatment of a specific ore, known as Gilman ore, will be fully explained. This is a sulfide ore obtained from Gilman, Colorado and one sample of this ore has the following analysis:

| Total sulfur | Fe | Pb | Cu | Zn | CaO | MgO | SiO$_2$ |
| --- | --- | --- | --- | --- | --- | --- | --- |
| 33.1 | 30.9 | 0.8 | 0.4 | 15.2 | 1.0 | 0.4 | 2.2 |

Since the chief ore metal of value is zinc, then if lime is selected for the alkaline earth material, it is calculated in amount to be the molecular equivalent of the zinc, in order that there may be sufficient calcium present to combine with all the available sulfate radical which might otherwise go to form zinc sulfate. The iron may be disregarded in this calculation since it will easily go to the oxide form. The molecular weights of the zinc and calcium oxide being in the ratio of 65 to 56, this gives a theoretical amount of 13.09 lbs. of CaO for the 15.2 lbs. of zinc. While the various conditions of the calcination process as well as the particular chemical composition of the ore necessarily determine the exact amount of lime used, I generally prefer to have the lime in excess of the theoretical amount. A satisfactory treatment of the above described ore is obtained by utilizing 83 parts of ore and 17 parts of calcium oxide.

It is to be noted that in this ore there is 33.1% sulfur and that the iron forms 30.9%. This particular ore composition makes the roasting or calcining operation difficult, since there is a considerable amount of sulfur trioxide formed because of the catalytic effect of the iron oxide in the calcine upon the sulfur dioxide produced by burning the sulfur from the ore. Hence in that case it is desirable to have an excess of lime present in the calcine so as to be sure to take up all of the sulfur trioxide that tends to combine with the zinc oxide. Such lead as is present goes largely to the sulfate form. It will of course be understood that the amount of oxygen introduced into the reaction chamber may be regulated and thus aid in controlling both the temperature and the oxidizing conditions of the process.

The raw ore specified in the above example is ground to a coarse size, such as will pass through a screen of 20 meshes to the linear inch. After the amount of lime required has been calculated by sampling the ore, the calcium oxide, which has been previously obtained by burning limestone, is added to the ore material and this mixture is then ground, and preferably in the presence of water, so that the material will be in a very finely divided condition, such as will pass through a screen of 150 meshes to the inch. During this grinding operation the calcium oxide is hydrated, and it will react with any zinc sulfate which happens to pe present in the ore and convert it to zinc oxide and form gypsum. Thereafter, this slurry is dried in a suitable apparatus, but without separation of the soluble salts from the mixture, and the dry material comprising the ore particles coated or intimately associated with calcium hydrate is then ready to be calcined, but preferably after being crushed or disintegrated to the size of a pea or finer to have all the particles small enough to minimize the likelihood that unconverted sulfide hearts will remain inside the pellets.

For the calcining operation I may utilize various types of apparatus but preferably employ a rotary calcining kiln made up of a long rotary tube inclined at such an angle that the material will gradually pass through the rotating tube from one end to the other while it is being thoroughly stirred or agitated by means of lifting flanges on the inside of the tube.

In order to start and promote the roasting operation, heat is applied to the tube, as by means of a gas or oil flame introduced at the lower end of the calciner and properly regulated as required. The particles of mixed ore and lime are fed into the upper end of this calcining chamber and are ignited as they travel downwardly therethrough. The material above specified will burn autogenously at a temperature between 550° and 700° C. It is to be understood that the temperature conditions will be regulated in accordance with the nature of the materials being treated or of the final product which is desired. The temperature is preferably kept as low as possible, as above explained, and preferably just high enough to keep the ore sulfide burning autogenously. The Gilman ore as above described requires very little outside thermal input after the calcining starts, because the fuel is largely furnished by the pyrites which is present in the ore. On the other hand, an ore which is low in sulfur and high in silica may require considerable outside heat to keep it burning and complete the oxidation of the ore body and remove the residual sulfides. The rate at which the material passes through the calciner and the amount of air introduced to the material will of course be regulated depending upon the composition of the calcine, it being understood that the desirable end is to obtain as much of the ore metal values as possible in the oxide form.

In the case of the Gilman ore specified above, the calcine consists largely of iron and zinc oxides together with some copper oxide and lead oxide and lead sulfate together with other ingredients of the ore which are not of importance. The desired zinc is in the form of an oxide and may therefore be easily recovered by means of a suitable solvent or converted to a suitable compound by a fluid reagent. If the ore being treated is more complex and contains various valuable metals the calcine will necessarily be treated in several stages for recovering the metals but whether the ore be simple or complex I am able to dissolve desired materials from the calcine because of the preliminary treatment above described.

In accordance with my invention and in order to carry out the second stage of my process, I leach the calcine with a solvent for the desired ore values, and preferably with a solution of ammoniacal ammonium carbonate or sulfate which is capable of extracting metals by the formation of soluble complex ammonium salts. I may employ for this purpose the crude product known as gas house liquor. For example, if ammonium carbonate dissolved in ammonium hydroxide is used as the solvent, zinc will go into solution as a complex salt, which is believed to be tetra-amino zinc carbonate, in accordance with the following formula:

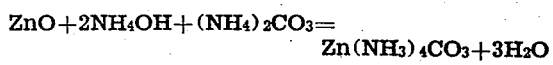

$$ZnO + 2NH_4OH + (NH_4)_2CO_3 = Zn(NH_3)_4CO_3 + 3H_2O$$

If copper is present it will go into solution likewise. Any suitable apparatus may be employed for this purpose, it being merely essential to have the ammonia liquor contact thoroughly with the calcine, and it is preferable to place the calcine and liquor in a suitable receptacle and digest the same for a suitable length of time and under proper temperature conditions. In this process the ammoniacal ammonium carbonate and sulfate are equivalents of each other, although the steps following the digestion with these reagents are necessarily different.

In order to make the process economical and in the case where lime is used as a reagent in the calcining operation, then I may burn limestone to form calcium oxide and the $CO_2$ gas evolved is conducted to an absorber where it, together with ammonia gas, is passed into an ammonium carbonate or sulfate solution to produce the solvent for the metal oxides. If ammonium carbonate is employed, the digesting operation may be conducted under heat conditions which cause copper to separate out as copper carbonate or copper oxide and go with the residue while zinc compounds remain in solution. After filtering, the zinc solution may be heated to drive off ammonia which is used for making the ammonium carbonate reagent and zinc carbonate is precipitated. This zinc carbonate may be calcined to produce zinc oxide and $CO_2$ gas and the latter then returned to the process for making the ammonium salt reagent. If desired, the zinc may be electrolytically precipitated from the solution as zinc metal and the generated gases returned to process.

If copper is present, it may be found in both the residue and the ammoniacal solution. The solution may be evaporated to precipitate the copper, and the residues treated with the sulfur dioxide gas coming from the calciner and in the presence of water to form copper sulfite, and the copper may be precipitated as copper carbonate after filtering by passing into the filtrate some of the $CO_2$ gas which has been produced elsewhere in the process. If lead is present in the residue coming from the digestor after the dissolved ammonium salts have been filtered off this may be dissolved by treatment with hot sodium chloride solution to form lead chloride and the latter may be recovered by suitable methods.

It is also feasible to leach the roasted complex ore with the ammoniacal sulfate and then pass the filtrate through a tower filled with zinc shot. This serves to precipitate those metals in solution which are less electro-negative than zinc, and these may be separated as slimes in which are found such metals as copper, cadmium, arsenic, antimony, bismuth, cobalt, nickel and manganese. The zinc may be recovered by electro-deposition if desired, it being noted that iron and lead compounds are almost insoluble in the ammoniacal ammonium carbonate solution, hence they do not affect the electrolysis of the zinc solution and the cathode zinc therefore contains but little iron and lead.

The zinc may be recovered by leaching with the ammonia solution in accordance with the present process because it is present in the calcine as an oxide and because it is not combined to any material extent with iron as a ferrate or ferrite, this condition arising from the fact that the alkaline earth material used in the calcining operation has left the calcine in proper condition for this extraction. In the leaching operation the calcium sulfate is converted to calcium carbonate and this goes with the residue, which may be treated as desired. In the example given above, there is a large percentage of iron sulfide in the ore. This is converted to iron oxide when roasted and it stays as such throughout the succeeding stages of the process. Consequently the residue is made up largely of this iron oxide mixed with some calcium carbonate and various silicates and other material coming from the gangue. The product is reddish in color and is finely divided. Hence it is in proper condition for use as a pigment to make a cheap paint. It will therefore be appreciated that in accordance with my invention, I may make use of a large portion of the ore and that the process may be modified to produce various end products in accordance with the demands of the market.

It will now be apparent that in accordance with this invention an ore material, whether simple or complex in its nature and whether concentrated or low in ore values, may be readily brought to a porous, pulverulent or friable, non-sintered, open-structured condition which may be readily permeated by liquid or gaseous reagents adapted to dissolve ore metal values or to convert the same to soluble compounds. The roasting operation may be carried on autogenously or under low temperature conditions which prevent volatilization of the ore values and which minimize the tendency for the silicates and other materials in the gangue to fuse or sinter, or for the pulverulent ore particles to be agglomerated into masses which are penetrated with difficulty by the fluid reagents. The alkaline earth material serves both in a chemical and a physical capacity. It takes up the available sulfate radical as an alkaline earth metal sulfate, and particularly as an insoluble compound of calcium, strontium and barium which may be readily separated from the soluble ore metal values. The alkaline earth material also serves to coat the ore particles or to separate them physically and so prevent inter-reactions between the constituents of adjacent particles. The ore material is kept in a pulverulent condition or is so friable that it may be easily crushed to its original particle size. Moreover, such metals as zinc which tend to form either an oxide or a sulfate during the operation of roasting a sulfide thereof are now compelled to go to the oxide form and may be readily recovered free from their sulfates, such as by a chloridizing operation. In that case, the roasted ore containing the desired ore metal oxides may be treated with hydrochloric acid gas and other chloridizing agents. It is found that even in the case of low silicate ores which do not sinter readily, the use of lime and similar alkaline earth materials tends to prevent the agglomeration of the ore metal particles and to keep them separated and, therefore, make them more easily and rapidly permeated by the gas employed for chloridizing the ore metal oxides. It will now be appreciated that alkaline earth metal compounds, which have heretofore been considered detrimental in hydro-metallurgical treatments of ores, have been employed to a useful end; and that this invention is to be interpreted as relating to the preparation of ore materials for subsequent steps involving the treatment of the calcined or roasted product by fluid reagents, such as a chloridizing gas or a solvent for an ore metal value.

Having thus described my invention, what I claim as new and desire to secure by Letters Patent is:

1. The method of treating an ore containing metal values and gangue comprising the steps of grinding the ore, roasting it in the presence of and intimately associated with a considerable amount of an alkaline earth metal compound and a sulfur-bearing material which are capable of and are proportioned for reacting during the roasting operation to form an insoluble alkaline earth metal sulfate, maintaining low temperature conditions and agitating the material to minimize the tendency for the ore particles to sinter together, and thereby forming a roasted product, containing said sulfate intimately interspersed with the ore metal values, which is in a pulverulent or friable, non-sintered condition and is readily permeated by gaseous or liquid reagents, and thereafter treating said product with a reagent for converting an ore metal value to a soluble and recoverable compound which is readily separated from the gangue and insoluble alkaline earth metal sulfate.

2. The method of treating a metallurgical ore comprising the steps of roasting the pulverized ore in the presence of a sulfur bearing material and a compound of an alkaline earth metal which are capable of reacting to form alkaline earth metal sulfate interspersed throughout the mass, and so proportioning the ingredients and so carrying on the operation as to insure that at least 10% of the roast is an alkaline earth metal sulfate and that the product is a non-sintered and pulverulent or friable, porous material capable of being efficiently treated directly by a chemical reagent and converted to a recoverable compound.

3. The method of treating a metallurgical ore comprising the steps of roasting the raw pulverized ore in the presence of a material providing available sulfate radical and an oxygen compound of an alkaline earth metal which are capable of and are proportioned for reacting to form alkaline earth metal sulfate, agitating the mixture during the roasting operation and maintaining furnace conditions which will form said sulfate interspersed throughout a non-sintered pulverulent or friable product containing an oxide of an ore metal, and subsequently treating the mass with a chemical reagent to convert said ore metal oxide to a soluble compound.

4. The method of treating a metallurgical ore comprising the steps of grinding it and mixing it intimately with an alkaline earth metal oxygen compound, said mixture containing a sulfur bearing ingredient capable of and proportioned for reacting with said compound to produce a considerable amount of an alkaline earth metal sulfate, then roasting the mixture under furnacing conditions which will produce an ore metal oxide and said sulfate interspersed throughout the roast and form a non-sintered, porous pulverulent material, and thereafter dissolving the ore metal oxide from the calcine and separating and recovering the same.

5. The method of treating a metallurgical ore comprising the steps of providing an intimate mixture containing the ore, water, a material providing an available sulfate radical and an oxygen compound of an alkaline earth metal, said compound being present in amount sufficient to react with the available sulfate radical to form alkaline earth metal sulfate, drying the ore mixture, then stirring and roasting the mixture under low temperature furnace conditions which produce said sulfate interspersed throughout the roast and provide a non-sintered, porous and pulverulent or friable product capable of being easily treated by chemical reagents for converting ore metal values to soluble compounds.

6. The method of treating an ore containing a metal sulfide and gangue comprising the steps of pulverizing the ore, mixing intimately therewith an alkaline earth metal compound capable of and proportioned for reacting during roasting with the available sulfate radical to form an alkaline earth metal sulfate, roasting the ore in an oxidizing atmosphere, while maintaining conditions which prevent sintering of the ore particles, and thereby producing a roasted product containing the alkaline earth metal sulfate intermingled with the ore metal values which is in a pulverulent or friable, non-sintered condition having substantially all of the ore metal values exposed to attack by gaseous or liquid reagents adapted for converting the values to recoverable compounds.

7. The method of treating an ore containing a metal sulfide and gangue comprising the steps of mixing the raw ore intimately and in pulverized condition with an alkaline earth metal compound capable of and proportioned for combining during roasting with the available sulfate radical to form a considerable amount of an insoluble alkaline earth metal sulfate, roasting the mixture under oxidizing and low temperature conditions, while agitating the material, so as to produce a non-sintered, pulverulent or friable, porous material containing said sulfate radical fixed as an insoluble alkaline earth metal sulfate, thereafter treating the roasted material with a reagent which permeates the same and converts an ore metal value to a soluble compound, and separating the soluble compound from the insoluble alkaline earth metal sulfate and gangue.

8. The method of treating an ore containing gangue and sufficient metal sulfide for autogenous roasting comprising the steps of pulverizing the ore and mixing it intimately with an alkaline earth metal compound capable of reacting during roasting with available sulfate radical to form an insoluble alkaline earth metal sulfate, the amount of said compound utilized depending on the nature of the ore being treated but being sufficient to prevent sintering and provide a product which is readily permeated by reagents, then roasting the mixture in an oxidizing atmosphere and autogenously, while agitating it and maintaining conditions which prevent sintering or fusion of the ore particles, and thereby forming a pulverulent or friable material having substantially all of the roasted ore metal compound exposed to attack by gaseous or liquid reagents, and thereafter treating the roasted material with a reagent which permeates the ore particles and produces a soluble ore metal compound which is separable from the gangue and the insoluble alkaline earth metal sulfate.

9. The method of treating a complex sulfide ore comprising the steps of mixing it intimately and in finely divided condition with an oxygen compound of an alkaline earth metal capable of and proportioned for reacting with all of the available sulfate radical, said materials being in such proportions that said compound will be in excess at the end of the roasting operation, and thereafter roasting the mixture to form alkaline earth metal sulfate interspersed throughout the mass and to produce a non-sintered, non-vitreous, porous and pulverulent material which is capable of being readily treated with reagent solutions to dissolve ore metal values therefrom.

10. The method of treating a metallurgical sulfide ore containing a metal sulfide capable of roasting to an oxide form comprising the steps of forming an intimate mixture of the finely divided ore with a finely divided alkaline earth metal compound which are capable of reacting during roasting and are so proportioned as to form an alkaline earth metal sulfate which constitutes at least 10% of the calcine, and then roasting the mixture while agitating it under furnace conditions which serve to burn the ore metal sulfide and form said sulfate and an oxide of a valuable ore metal and to produce a friable or pulverulent mass which may be readily attacked by reagents to convert said oxide to a soluble compound.

11. The method of treating a metallurgical ore comprising the steps of mixing it intimately and in finely divided condition with a calcium oxygen compound and with a material capable of providing available sulfate radical to form calcium sulfate during the roasting operation, said materials being so proportioned that the calcium sulfate will form a considerable portion of the roasted mass and the calcium oxygen compound being in excess of that required to combine with all available sulfate radical, then roasting the material to form said calcium sulfate interspersed throughout a porous, pulverulent, non-sintered product containing an ore metal oxide and subsequently converting the ore metal oxide to a soluble compound.

12. The method of treating a metallurgical sulfide ore comprising the steps of mixing the raw ore intimately and in finely divided condition with an oxygen compound of calcium capable of reacting with available sulfate radical and which is proportioned in amount to remain in excess at the end of the roasting operation, then roasting the mixture under furnace conditions which produce ore metal oxide and calcium sulfate interspersed throughout a non-sintered, highly porous granular material and thereafter dissolving ore metal oxide by a chemical reagent.

13. The method of treating a metallurgical ore containing zinc sulfide comprising the steps of intimately mixing the raw ore in finely divided condition with an oxygen compound of an alkaline earth metal which is present in amount in excess of that required to prevent the formation of zinc sulfate and which is capable of forming an alkaline earth metal sulfate by reaction with the available sulfate radical formed during the operation and then agitating the mixture while roasting it under furnace conditions capable of forming a pulverulent non-sintered mass containing zinc oxide and said alkaline earth metal sulfate.

14. The method of treating a complex metallurgical sulfide ore comprising the steps of intimately mixing the ore with an oxygen compound of an alkaline earth metal which is capable of reacting with available sulfate radical to form alkaline earth metal sulfate, the alkaline earth metal compound being present in amount in excess of that required as the molecular equivalent of such ore metals as are capable of forming metal oxides during the roasting operation, and then agitating the mixture while roasting it under controlled furnacing conditions at a temperature at which the sulfide ore will burn and will form a pulverulent non-sintered and non-vitreous granular material containing said alkaline earth metal sulfate, which is capable of being leached easily to convert the ore metal oxides to soluble salts.

15. The method of treating a metallurgical ore comprising the steps of making an intimate mixture of the finely divided ore and the hydrate of an alkaline earth metal, said mixture including a sulfur bearing compound which, during roasting, is capable of forming a considerable amount of sulfate of the alkaline earth metal interspersed throughout the calcine, and roasting the mixture to form said alkaline earth metal sulfate and produce a non-sintered porous material which is easily permeable to chemical reagents.

16. The method of recovering values from a metallurgical ore containing an ore metal sulfate comprising the steps of intimately mixing the finely divided ore with water and an alkaline earth metal oxygen compound which is capable of uniting with the sulfate radical of the ore metal to produce a sulfate of said alkaline earth metal, thereafter roasting the mixture in the presence of an excess of said compound to form a porous non-sintered product containing ore metal oxide and alkaline earth metal sulfate which is free from said ore metal sulfate and then converting the ore metal oxide to a recoverable soluble salt other than the sulfate.

17. The method of treating a metallurgical sulfide ore comprising the steps of mixing the ore in finely divided condition with calcium oxide in the presence of water so that a reactable ore metal sulfate may combine therewith to form calcium sulfate and an ore metal oxide and thereafter drying and calcining the sulfide bearing material under furnacing conditions which will form calcium sulfate interspersed throughout the calcine and an ore metal oxide.

18. The method of treating a complex sulfide ore comprising the steps of preliminarily burning limestone to form lime, then roasting the raw ore and lime mixed together in a finely divided condition under furnace conditions below the decomposition temperature of calcium carbonate but at which the sulfide ore will burn, so as to form calcium sulfate interspersed throughout the mass and prevent the formation of a sintered or vitreous product, and subsequently treating the roasted material with a reagent which permeates it and converts an ore metal value to a soluble compound and separating the same from the calcium sulfate and gangue.

19. The method of treating a metallurgical ore containing the sulfides of iron and a valuable metal comprising the steps of roasting the raw ore with an alkaline earth metal compound which is capable of reacting with the available sulfate radical to form alkaline earth metal sulfate in the roast, said compound being present in amount in excess of that required to combine with all of the available sulfate radical, and thereby forming iron oxide and a non-sulfur compound of the ore metal, and subsequently treating the roast to recover the valuable metal but retain the iron in the oxide form and separating the residue containing the iron from the ore metal values.

20. The method of treating a metallurgical ore containing sulfides of iron and valuable ore metals comprising the steps of mixing the ore with a calcium oxygen compound in finely divided condition which is added in amount equal to the molecular equivalent of such metal in the ore, except the iron, as is capable of being converted to an oxide during roasting, then agitating and roasting the mixture under furnacing conditions which burn the sulfides and form a non-sintered granular material containing calcium sulfate and the oxides of iron and a valuable ore metal, and subsequently treating the roasted granular material with a chemical reagent capable of converting said oxide of the valuable ore metal to a soluble form.

21. The method of treating a metallurgical ore comprising the steps of burning limestone to form calcium oxide and carbon dioxide gas, calcining the ore in intimate contact with said oxide and a sulfur bearing material capable of forming calcium sulfate during the roasting operation and of producing a non-sintered leachable material, passing said carbon dioxide and ammonia into ammonium hydroxide, leaching the calcine with the ammonium solution to dissolve an ore metal value, and subsequently recovering the ore metal value and producing ammonia gas for reuse in the leaching solution.

22. The method of making a pigment comprising the steps of mixing a finely divided metallurgical ore containing compounds of iron and desired ore metal values with an alkaline earth metal compound and a sulfate capable of reacting when calcined to form an alkaline earth metal sulfate, calcining the mixture to form a pulverulent mass containing iron oxide, and subsequently separating the desired ore metal values therefrom and leaving the residue containing iron oxide as a pigment powder.

23. The method of treating a complex ore containing metal sulfides comprising the steps of making an intimate mixture of the ore particles with a hydrated alkaline earth metal compound capable of reacting with available sulfate radical to form an alkaline earth metal sulfate and thereafter roasting the ore mixture under conditions which form a pulverulent, porous product containing said sulfate which is capable of being readily permeated by chemical reagents.

24. The method of treating a complex sulfide ore comprising the steps of grinding the ore, mixing it with water and an alkaline earth metal compound capable of and proportioned for combining with available sulfate radical during roasting, drying the slurry and roasting it under furnacing conditions capable of dehydrating the alkaline earth material and of forming a pulverulent, porous and non-sintered product.

25. The method of treating an ore containing a metal sulfide comprising the steps of mixing the ore with water and an alkaline earth metal hydrate in amount calculated to be the equivalent of the sulfate radical available for reaction during the subsequent roasting operation, drying the ore mixture to remove the water of hydration and form a porous granular product and roasting the granular product under oxidizing conditions to remove sulfur from the ore and form a product containing alkaline earth metal sulfate interspersed therethrough.

26. The method of treating an ore comprising the steps of grinding the ore, providing a slurry which contains the ore, water, a sulfur bearing material and a compound of an alkaline earth metal which are capable of reacting during the roasting operation to form alkaline earth metal sulfate, drying the slurry and removing water of hydration therefrom and thereby forming a porous mass of intimately mixed ore and alkaline earth material, and roasting the mixture under oxidizing conditions while agitating it and forming alkaline earth metal sulfate interspersed throughout a porous pulverulent product.

27. The method of treating a complex sulfide ore comprising the steps of grinding the ore and mixing it in the presence of water with alkaline earth metal oxide proportioned in amount sufficient to combine with all available sulfate radical during the roasting operation, drying the mass, and then roasting it under oxidizing conditions and at a low temperature which will serve to form alkaline earth metal sulfate interspersed throughout the mass and to produce a non-sintered, pulverulent or friable product having an open and porous structure capable of being readily treated by chemical reagents for recovery of substantially all of a desired ore metal value contained therein.

28. The method of treating a complex ore containing the sulfide of a metal capable of forming either an oxide or a sulfate during roasting, comprising the steps of mixing the ore in intimate and finely divided association with the oxygen compound of an alkaline earth metal which is capable of reacting with and proportioned for forming alkaline earth metal sulfate with all the available sulfate radical and causing said metal to go only to the oxide form, and thereafter roasting the mixture containing said raw ore and alkaline earth metal compound at a low temperature and under furnace conditions which will cause the formation of said ore metal oxide and produce a considerable quantity of alkaline earth metal sulfate interspersed throughout a non-sintered, porous and pulverulent or friable ore material which is free from soluble metal sufates and is capable of being treated directly by chemical reagents for converting substantially all of said metal oxide to a soluble compound.

29. The method of treating a complex ore containing the sulfides of zinc and lead comprising the steps of mixing the ore in finely divided condition with an oxygen compound of an alkaline earth metal capable of and proportioned for reacting with all available sulfate radical which would otherwise produce zinc sulfate during a roasting operation, roasting the mixture while agitating it and maintaining low temperature furnace conditions, and thereby producing a non-sintered, porous, pulverulent product free from zinc sulfate and containing zinc oxide, lead sulfate, and alkaline earth metal sulfate in intimate association, and thereafter converting the zinc oxide to a soluble compound and separating the same from the lead compound and residue.

30. The process of treating a complex ore containing sulfides of lead and zinc comprising the steps of providing a mixture of the raw ore in finely divided condition and in intimate association with a calcium oxygen compound capable of and proportioned for reacting during roasting with all available sulfate radical not taken up by the lead and which would normally tend to form zinc sulfate, roasting the mixture while agitating it and maintaining low temperature furnace conditions which result in the formation of a non-sintered, open-structured, pulverulent material containing a lead oxygen compound and zinc oxide and in the fixation of the available sulfate radical as calcium sulfate interspersed throughout the mass.

31. The method of treating a complex ore containing compounds of zinc, lead and iron, comprising the steps of roasting the ore in finely divided condition and in the presence of a material providing available sulfate radical and an alkaline earth metal compound capable of and proportioned for reacting to form sufficient alkaline earth metal sulfate in intimate association with the roasted ore to produce a pulverulent and open-structured ore particle, agitating the mixture during roasting to hold the ore particles from close contact and maintaining low temperature furnacing conditons to produce a non-sintered, porous product amenable to treatment by chemical reagents for the recovery of soluble compounds free of soluble sulfates.

32. The method of treating a complex ore comprising the steps of providing a finely divided intimate mixture containing raw ore, a metal sulfide and calcium oxide capable of and proportioned for reacting with all available sulfate radical during the roasting operation to form sufficient calcium sulfate to make up at least 10% of the mass, then agitating and roasting the mixture under oxidizing conditions, while maintaining a low temperature suitable for burning the sulfide sulfur without sintering the mass, and thereby producing a pulverulent or friable, porous product capable of being treated directly by chemical reagents for recovering substantially all of a desired ore metal value and in which the available sulfate radical is fixed as insoluble calcium sulfate.

33. The method of treating a complex ore containing the sulfides of several metals, comprising the steps of making a finely divided, intimate mixture in the presence of water of the raw ore and a calcium oxygen compound capable of and proportioned for reacting with available sulfate radical during the roasting operation to form calcium sulfate, drying the mixture and removing water of hydration therefrom, roasting the material in a pulverulent form under oxidizing conditions, while agitating it and maintaining a temperature sufficiently high for burning the sulfide sulfur but without sintering or slagging the material, and thereby producing a pulverulent or friable, porous product containing an ore metal oxide in which the available sulfate radical is fixed as insoluble calcium sulfate interspersed throughout the mass, and thereafter treating the material to convert metal values to soluble compounds.

34. The method of treating a complex ore which is low in sulfide sulfur comprising the steps of mixing the raw ore with sufficient metal sulfide to provide the necessary heat of reaction and with alkaline earth metal oxygen compound capable of and proportioned for reacting with the available sulfate radical and forming alkaline earth metal sulfate, producing an intimate, finely divided mixture of said materials in the presence of water, drying the same, roasting the mixture autogenously under oxidizing conditions, while agitating the mass and maintaining a temperature which burns the sulfide sulfur and produces a pulverulent or friable, porous and non-sintered material containing said alkaline earth metal sulfate interspersed throughout the mixture which is capable of being treated directly and substantially completely by reagents to form soluble ore metal compounds.

35. The method of treating a complex ore containing a high sulfide content comprising the steps of mixing it intimately and in pulverized condition with alkaline earth metal oxide proportioned for reacting with the available sulfate radical during the roasting operation and forming an insoluble sulfate therewith, roasting the ore mixture autogenously while agitating it and maintaining controlled temperature conditions which cause the formation of a non-sintered, porous, pulverulent product free from water soluble ore metal sulfates and then leaching said product with a reagent solution capable of dissolving an ore metal value and forming a sulfate free solution thereof.

36. The method of treating a complex ore containing a metal sulfide comprising the steps of providing an intimate mixture of the ore with an alkaline earth metal compound capable of and proportioned for reacting with all available sulfate radical during the roasting operation, roasting the mixture while agitating it and maintaining conditions which produce a non-sintered, pulverulent product having a porous structure and which is free from water soluble ore metal sulfates, and then treating the roasted material with a reagent capable of converting an ore metal value to a soluble compound other than the sulfate.

37. The method of treating a sulfide ore containing the sulfide of a metal capable of roasting to either an oxide or a sulfate comprising the steps of grinding the ore and mixing it intimately with the oxygen compound of an alkaline earth metal which is capable of reacting with and is proportioned for forming alkaline earth metal sulfate with all of the available sulfate radical, roasting the mixture at a low temperature and under furnace conditions which will cause the formation of porous granules having the oxide of said metal and said alkaline earth metal sulfate in intermingled relationship and being free from soluble metal sulfates, and thereafter treating the material with a reagent capable of converting said metal oxide to a soluble compound other than the sulfate.

38. The method of treating a complex ore which contains a metal sulfide and has a high content of slag-forming constituents, comprising the steps of mixing the ore in a finely divided condition with calcium oxide and water, drying the mixture to form a coating of calcium hydrate on the ore particles, and thereafter gradually raising the temperature of the ore mixture to produce hydrated calcium sulfate and then, as the temperature increases, to remove the water of hydration from the calcium compounds and roast the ore and produce a granular material having a high porosity which is readily permeated by gaseous or liquid reagents.

THOMAS A. MITCHELL.